United States Patent [19]

Wilcher

[11] Patent Number: 5,468,391
[45] Date of Patent: Nov. 21, 1995

[54] SLUDGE FLIGHT SUPPORT RAIL ASSEMBLY

[75] Inventor: Stephen B. Wilcher, Harleysville, Pa.

[73] Assignee: FMC Corporation, Chicago, Ill.

[21] Appl. No.: 269,879

[22] Filed: Jul. 1, 1994

[51] Int. Cl.⁶ .................................................. B01D 21/18
[52] U.S. Cl. ........................... 210/525; 210/526; 210/541
[58] Field of Search ..................................... 210/523, 525, 210/526, 527, 541

[56] References Cited

U.S. PATENT DOCUMENTS

| | | | |
|---|---|---|---|
| 2,067,277 | 1/1937 | Mück | 210/525 |
| 2,160,535 | 5/1939 | Briggs | 210/525 |
| 2,393,725 | 1/1946 | Walker | 210/526 |
| 3,313,422 | 4/1967 | Swenson | 210/525 |
| 4,645,598 | 2/1987 | Hannum | 210/526 |

Primary Examiner—Christopher Upton
Attorney, Agent, or Firm—Henry C. Query, Jr.

[57] ABSTRACT

In a sludge collector mechanism having a sludge flight for scraping settled sludge off the bottom of a settling tank and skimming floating waste from the surface of the water contained in the tank, a support rail assembly for maintaining the flight on a level generally even with the surface of the water, the support rail assembly comprising a non-metallic longitudinal track on which the end of the flight is slideably supported and at least one non-metallic mounting bracket for securing the track relative to the sidewall of the settling tank. The track comprises a cross section having a substantially horizontal rail portion, a transverse stem extending downward from the underside of the rail portion, and two opposing fingers, one extending upward from the bottom of the stem and one extending downward from the underside of the rail portion. The mounting bracket comprises a mounting plate through which the mounting bracket can be bolted to the sidewall and a mounting head having two opposing grooves into which the two opposing fingers are slideable received to thereby connect the track to the mounting bracket.

5 Claims, 3 Drawing Sheets

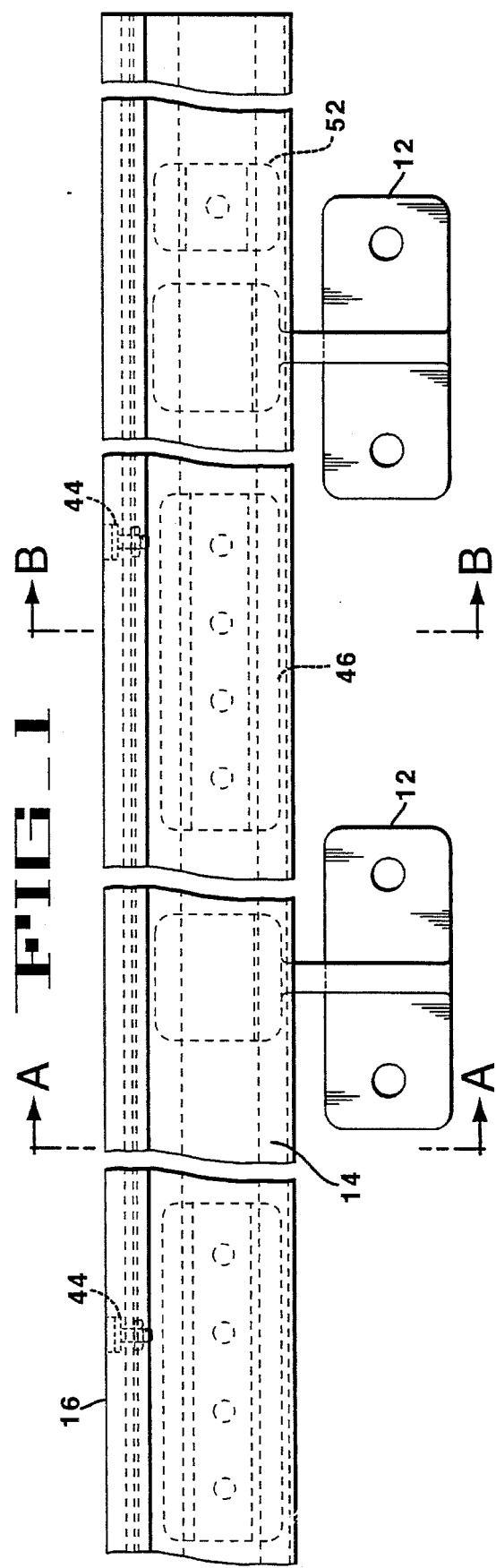
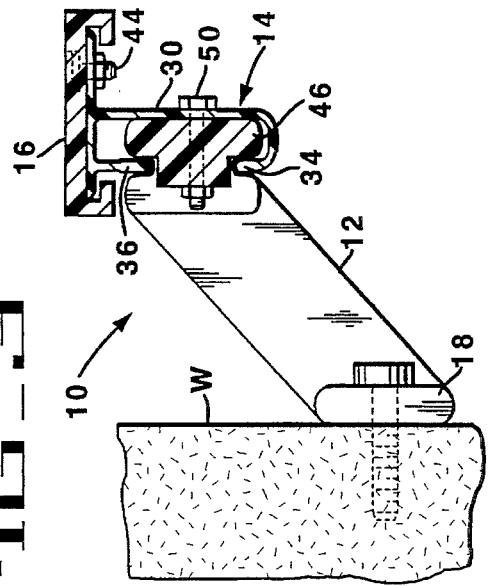
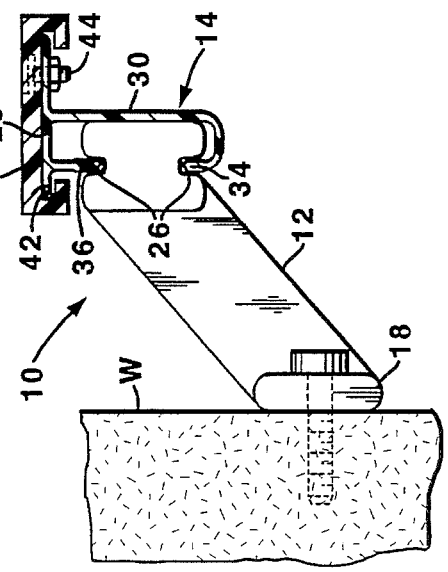

FIG_4
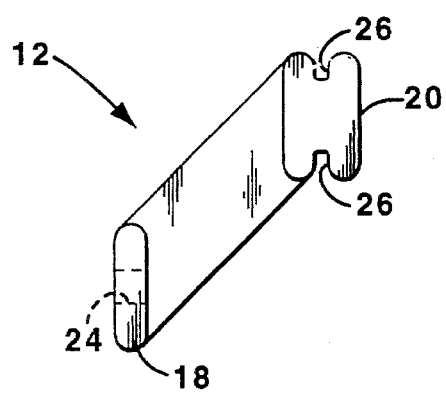
FIG_5
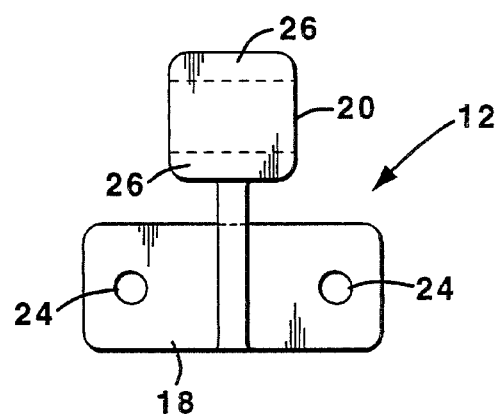
FIG_7
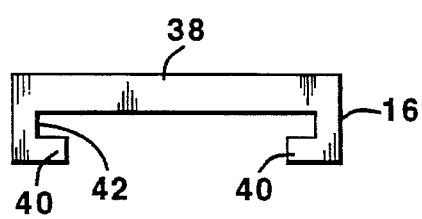
FIG_8
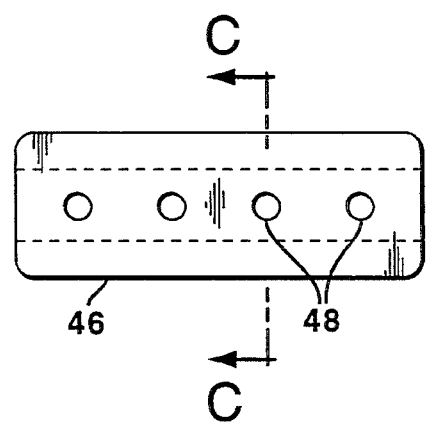
FIG_9
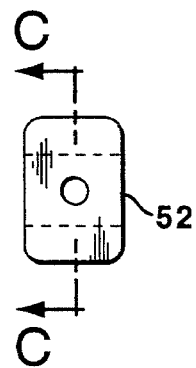
FIG_10

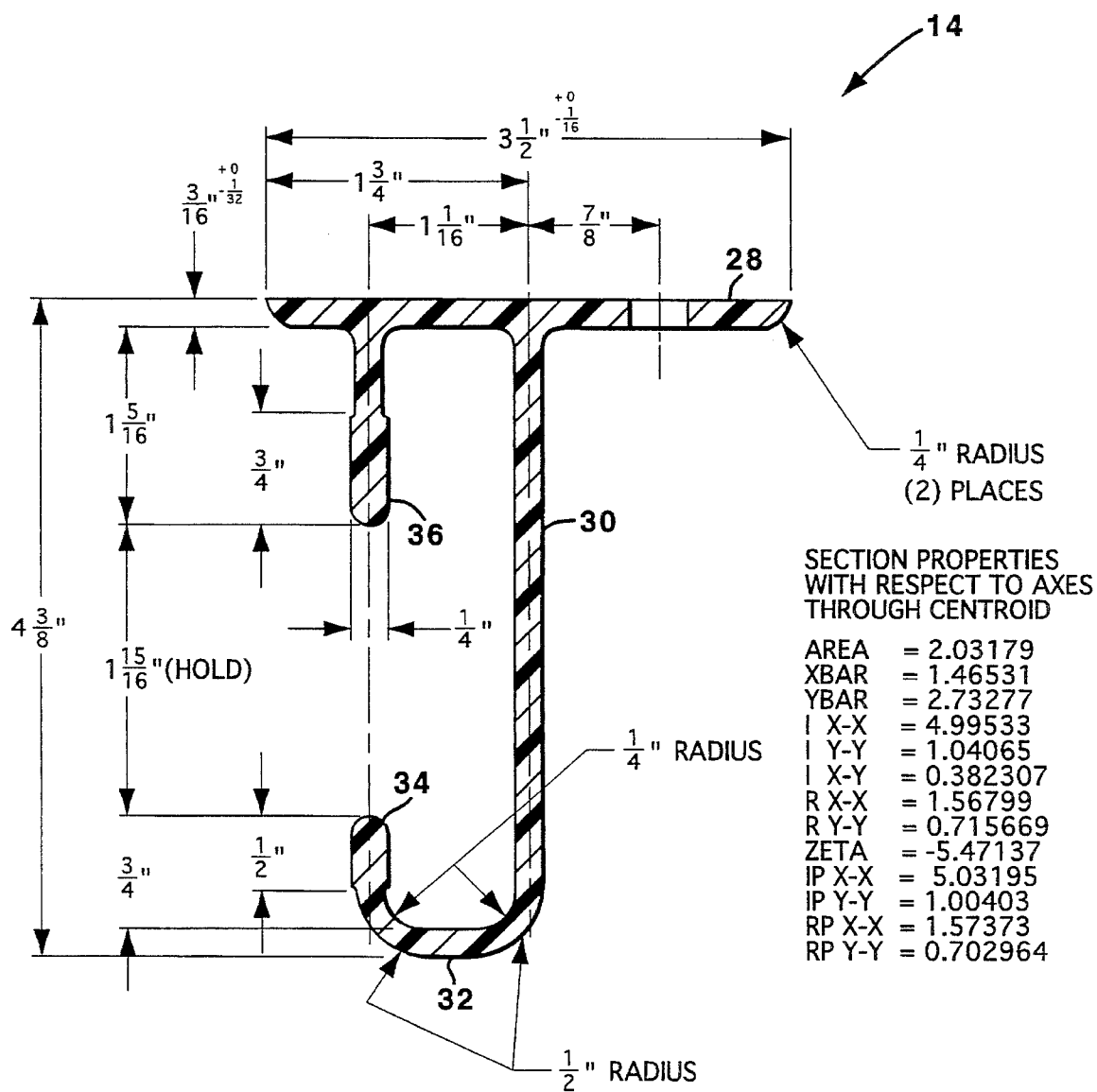
FIG_6

5,468,391

SLUDGE FLIGHT SUPPORT RAIL ASSEMBLY

BACKGROUND OF THE INVENTION

1. Field of the Invention

This invention relates to sludge collectors for removing sludge from rectangular settling tanks and, more particularly, to a support rail assembly for the sludge collector flight.

2. Description of Related Art

Sludge collectors are commonly used in waste water treatment plants to scrape the settled sludge from the bottom of the settling tank and also to skim floating waste off the surface of the waste water. These sludge collectors typically include a number of sludge flights, which are usually elongated members that extend the width of the tank. The ends of the flights are connected to drive chains, which carry the flights in a circuit lengthwise along the bottom of the tank and back over the surface of the water to perform the scraping and skimming functions. In addition, the ends of the flights are supported at the surface of the water by support rail assemblies, or tracks, which are fastened to the longitudinal sidewalls of the settling tank.

Prior art support rail assemblies are typically field-assembled from lengths of steel angle iron or channel which are spliced together with steel plate splice bars and mounted to the sidewalls of the tank with steel mounting brackets using an assortment of assembly hardware. The support rail assemblies are often provided with overlying replaceable wearing surfaces, such as plastic or steel wear bars. These steel support rail assemblies are heavy, which makes handling and field assembly cumbersome. In addition, the steel is subject to corrosion from exposure to the waste water, therefore requiring sandblasting and painting or the use of expensive stainless steel.

To overcome the problems inherent with steel support rail assemblies, some manufacturers have resorted to using commercially available, non-metallic extruded or molded components, such as the angles, wear bars and mounting brackets. However, when using a combination of metallic and non-metallic components, such as steel angle iron with non-metallic wear bars, buckling and separation between adjacent parts can occur due to differences in the coefficients of linear expansion. This can cause the flights to jam and, consequently, the chains to break. In addition, due to obvious structural limitations, prior art non-metallic support rail assemblies are usually limited to use with non-metallic flights and chains.

SUMMARY OF THE INVENTION

Therefore, it is an object of the present invention to provide a high-strength, non-metallic support rail assembly that is relatively easy to field assemble and is capable of supporting, within acceptable deflection criteria, either plastic or metallic flights and chains.

According to the present invention, these and other objects and advantages are achieved by providing a support rail assembly having a track, a bracket for mounting the track to the side of the settling tank and a wear strip connected to the top of the track. The track, mounting bracket and wear strip are manufactured from lightweight, non-metallic materials and are therefore easy to handle and assemble. The track comprises a "J"-shaped cross section which includes a horizontal rail, a transverse stem extending from the bottom of the rail and terminating in an upwardly curving hook, a lower finger formed on the end of the hook and an upper finger extending transversely from the bottom of the rail in the general direction of the lower finger. The shape and composition of the track are such that the track is sufficiently strong to support metal chains and flights without deflecting beyond acceptable criteria. The mounting bracket comprises a mounting plate through which the bracket is connected to the wall of the settling tank, a mounting head having two opposing grooves into which the fingers of the track are slideably received to connect the track to the bracket, and an oblique arm extending between the mounting head and the mounting plate to space the mounting head apart from the mounting plate. The wear strip comprises a "C"-shaped cross section into which the horizontal rail of the track is slideably received.

During assembly of the support rail assembly of the present invention, the mounting brackets are bolted to the wall of the settling tank, lengths of track are assembled onto the brackets by sliding the track onto the mounting heads, and lengths of wear strip are assembled with the track by sliding the wear strips over the horizontal rail. Alternatively, the track may be assembled onto the brackets before the brackets are bolted to the wall. Each wear strip is secured to the track with a single fastener, therefore making replacement of the wear strip quick and easy, and adjacent lengths of track are connected with a single non-metallic splice bar using only four clamping bolts. Finally, the track is securely and permanently positioned by a single rail stop at each end of the track which slides in from the end of the track adjacent the end mounting bracket and is then bolted in place. Thus, the support rail assembly of the present invention is fully corrosion resistant, requires a minimum number of components and fasteners, is lightweight and versatile, and is consequently relatively easy to field assemble.

These and other objects and advantages of the present invention will be made apparent from the following detailed description, with reference to the accompanying drawings.

BRIEF DESCRIPTION OF THE DRAWINGS

FIG. 1 is a front elevation view of the support rail assembly of the present invention;

FIG. 2 is a cross-sectional ,view of the support rail assembly taken along line A—A in FIG. 1;

FIG. 3 is a cross-sectional view of the support rail assembly taken along line B—B in FIG. 1;

FIG. 4 is a side elevation view of the mounting bracket according to the present invention;

FIG. 5 is a front elevation view of the mounting bracket depicted in FIG. 4;

FIG. 6 is a cross-sectional view of the track according to the present invention;

FIG. 7 is a cross-sectional view of the wear strip according to the present invention;

FIG. 8 is a front elevation view of the splice bar according to the present invention;

FIG. 9 is a front elevation view of the rail stop according to the present invention; and FIG. 10 is a cross-sectional representation of both the splice bar depicted in FIG. 8 and the rail stop depicted in FIG. 9, as taken along line C—C of those Figures.

DETAILED DESCRIPTION OF THE PREFERRED EMBODIMENTS

Referring to FIGS. 1 and 2, the support rail assembly of the present invention, indicated generally by reference number 10, is shown to comprise a number of mounting brackets 12, a track 14 and a wear strip 16. Mounting brackets 12 connect track 14 to a longitudinal sidewall W of the settling tank, and track 14 in turn provides lateral support for the corresponding ends of the flights (not shown). In a typical settling tank, two such support rail assemblies 10 are preferably employed, one on each longitudinal sidewall of the settling tank, so that both ends of each flight are supported. Wear strip 16 provides a sacrificial surface on which the ends of the flights may slide. The lengths of track 14 and wear strip 16 depend on the length of the settling tank into which support rail assembly 10 is installed. Lengths of up to three hundred feet are not uncommon. Therefore, track 14 is provided in standard lengths, for example twenty feet, which are connected together as will be described below. Wear strip 16 is similarly provided in standard lengths, such as ten feet.

Referring also to FIGS. 4 and 5, mounting bracket 12 comprises a mounting plate 18, a mounting head 20 and an oblique arm 22, which serves to space mounting head 20 apart from mounting plate 18. Mounting bracket 12 is preferably molded as a single unit from polypropylene or a similar nonmetallic material. In the preferred embodiment of the invention, the polypropylene has the following properties: a tensile strength of 500 psi, an elongation of 10–20%, a tensile modulus of $1.6 \times 10^5$ psi, a Rockwell hardness of 80–110, a flexural modulus of $1.7$–$2.5 \times 10^5$ psi, a specific gravity of 0.905, a specific volume of $30.8/30.4$ in$^3$/Lb, and a water absorption of 0.01–0.03% in 24 hours based on a ⅛" thick material. Mounting plate 18 includes two holes 24 through which bolts or similar fasteners can extend to attach mounting bracket 12 to the wall W of the settling tank. The top and bottom surfaces of mounting head 20 have formed therein opposing grooves 26, the purpose of which will be explained below. In the preferred embodiment of the invention, wherein track 14 is provided in twenty-foot lengths, two mounting brackets 12 are used to mount each length of track 14.

Referring to FIG. 6, track 14 comprises a "J"-shaped cross section which, in a preferred embodiment of the invention, has the dimensions and properties indicated in that Figure. The cross section of track 14 includes a horizontal rail 28, a transverse stem 30 extending from the bottom of rail 28 and terminating in an upwardly curving hook 32, a lower finger 34 formed on the end of hook 32 and an upper finger 36 extending transversely from the bottom of rail 28 in the general direction of lower finger 34. As shown in FIG. 2, lower and upper fingers 34, 36 are slideably received within opposing grooves 26 of mounting head 20 to thereby connect track 14 to mounting bracket 12. As also shown in FIG. 2, the width of fingers 34, 36 is only slightly smaller than the width of grooves 26, and the width of that portion of mounting head 20 between fingers 34, 36 and stem 30 is only slightly smaller than the distance between fingers 34, 36 and stem 30 to thereby minimize lateral movement of track 14 relative to mounting bracket 12. Track 14 is preferably a pultrusion fabricated out of isopthalic polyester reinforced with 55% glass fiber by weight having the following properties: a longitudinal tensile strength of 47,500 psi, a transverse tensile strength of 7,000 psi, and a modulus of elasticity of $4.8 \times 10^6$ psi. As indicated in FIG. 6, track 14 is designed to preferably have a cross-sectional area of 2.03179 in$^2$ and a moment of inertia in the longitudinal direction ($I_{x-x}$) of 4.99533. Thus, track 14 is sufficiently stiff in the longitudinal direction to support the weight of metallic chains and flights without deflecting beyond acceptable criteria.

Referring now to FIG. 7, wear strip 16 is shown to comprise a generally "C"-shaped cross section having an upper wear surface 38 and lips 40 extending inwardly from opposite sides of wear strip 16 to thereby form a channel 42. As shown in FIG. 2, rail 28 is slideably received within channel 42 to thereby connect wear strip 16 to track 14. Each length of wear strip 16 is secured to track 14 with a single fastener 44. Therefore, each length of wear strip 16 may be easily and quickly replaced, when necessary, by simply removing the single fastener 44. Wear strip 16 is preferably extruded UHMW polyethylene which, in the preferred embodiment of the invention, is virgin material certified in accordance with ASTM specification D-4020-81, with a molecular weight of 4.0 million or greater, a relative abrasion resistance of 12, an intrinsic viscosity of 24 or greater and a water absorption of 0.

Referring to FIGS. 1, 3, 8 and 10, individual lengths of track 14 are connected together using a splice bar 46. As shown in FIGS. 3 and 10, splice bar 46 comprises a cross section corresponding generally to the groove formed by stem 30 and lower and upper fingers 34, 36 of track 14. In addition, splice bar 46 preferably comprises a plurality of holes 48, which align with corresponding holes in track 14 when the adjacent ends of two lengths of track 14 are assembled with splice bar 46. Alternatively, the corresponding holes in track 14 may be field drilled during assembly of support rail assembly 10. Track 14 is secured to splice bar 46 with appropriate fasteners 50 extending through holes 48 and the corresponding holes in track 14. Splice bar 46 is preferably molded from polypropylene.

Referring now to FIGS. 1, 9 and 10, track 14 is secured against longitudinal movement relative to mounting brackets 12 by a rail stop 52 attached to each end of track 14. Each rail stop 52 is connected to track 14 adjacent the outside edge of the mounting bracket 12 nearest that end of track 14. Rail stops 52 comprise a cross section similar to splice bar 46, as shown in FIG. 10, and are secured to track 14 by any appropriate fasteners extending through corresponding holes in rail stop 52 and track 14. These holes are preferably field drilled, although one or both may be pre-drilled. Rail stops 52 are preferably molded from polypropylene.

During assembly of support rail assembly 10, mounting brackets 12 are connected to wall W at the appropriate locations, track 14 is slid onto mounting heads 20, individual lengths of track 14 are connected together with splice bars 46, track 14 is secured onto mounting brackets 12 with rail stops 52, and wear strips 16 are slid onto track 14. Alternatively, one or more components of support rail assembly 10 may be assembled before mounting brackets 12 are connected to wall W.

Therefore, it is seen that the support rail assembly 10 comprises only a few components which are readily assembled, is relatively lightweight due to the components being non-metallic, is relatively strong due to the construction of track 14, and is consequently easy to field assemble and suitable for use with all present combinations of chains and flights, including metallic chains and flights.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. In combination with a sludge collector mechanism having a sludge flight extending between the longitudinal sidewalls of a settling tank for scraping settled sludge off the bottom of the settling tank and skimming floating waste from the surface of the water contained in the settling tank, the improvement comprising:

a support rail assembly for maintaining an end of the flight on a level generally even with the surface of the water, the support rail assembly comprising a longitudinal track on which the end of the flight is slideably supported and at least one mounting bracket for securing the track relative to the sidewall of the settling tank;

wherein the track comprises a cross section having a substantially horizontal rail portion, a transverse stem extending downward from the underside of the rail portion, and two opposing fingers, one extending upward from the bottom of the stem and one extending downward from the underside of the rail portion;

wherein the mounting bracket comprises a mounting plate through which the mounting bracket can be bolted to the sidewall and a mounting head having two opposing grooves into which the two opposing fingers are slideable received to thereby connect the track to the mounting bracket;

wherein the track and the mounting bracket are constructed of non-metallic materials.

2. The sludge collector mechanism of claim 1, further comprising a wear strip having a generally "C"-shaped cross section forming a channel into which the rail portion is slideably received to thereby connect the wear strip to the track.

3. The sludge collector mechanism of claim 2, wherein the wear strip is comprised of sections of wear strip having a predetermined length and wherein the sludge collector mechanism comprises a single fastener for securing each section of wear strip to the track.

4. The sludge collector mechanism of claim 1, wherein the track is comprised of sections of track having a predetermined length and wherein the support rail assembly further comprises a splice bar for connecting the adjacent ends of successive sections of track.

5. The sludge collector mechanism of claim 4, wherein the splice bar is constructed of a non-metallic material.

* * * * *